E. D. DENNIS.
INDICATING MECHANISM.
APPLICATION FILED APR. 14, 1915.
1,187,273.
Patented June 13, 1916.
2 SHEETS—SHEET 1.
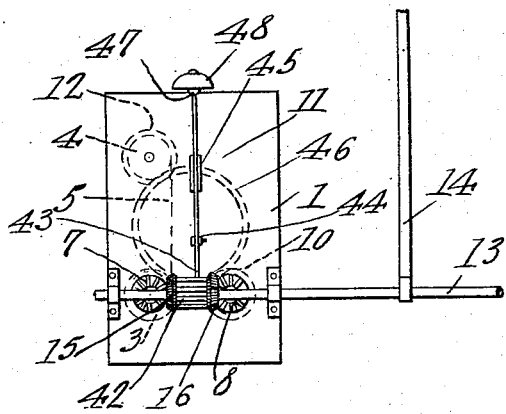
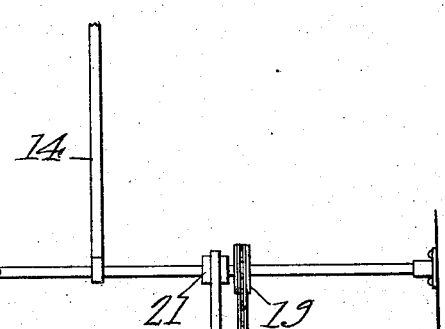
Fig. 1.
Fig. 8.
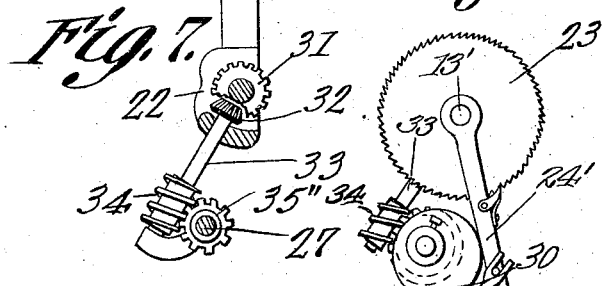
Fig. 7.
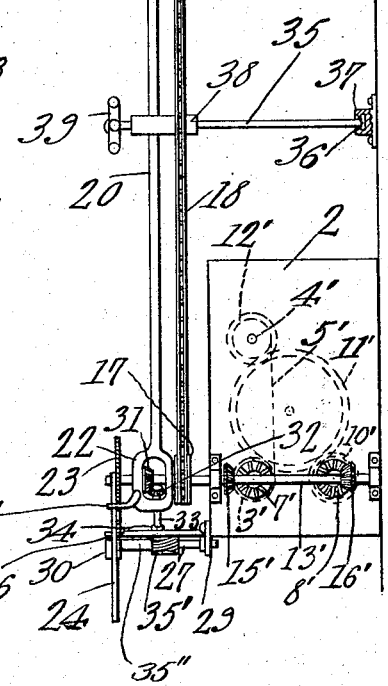
Fig. 6.
E. D. Dennis,
Inventor
by C. A. Snow & Co.
Attorneys
Witnesses

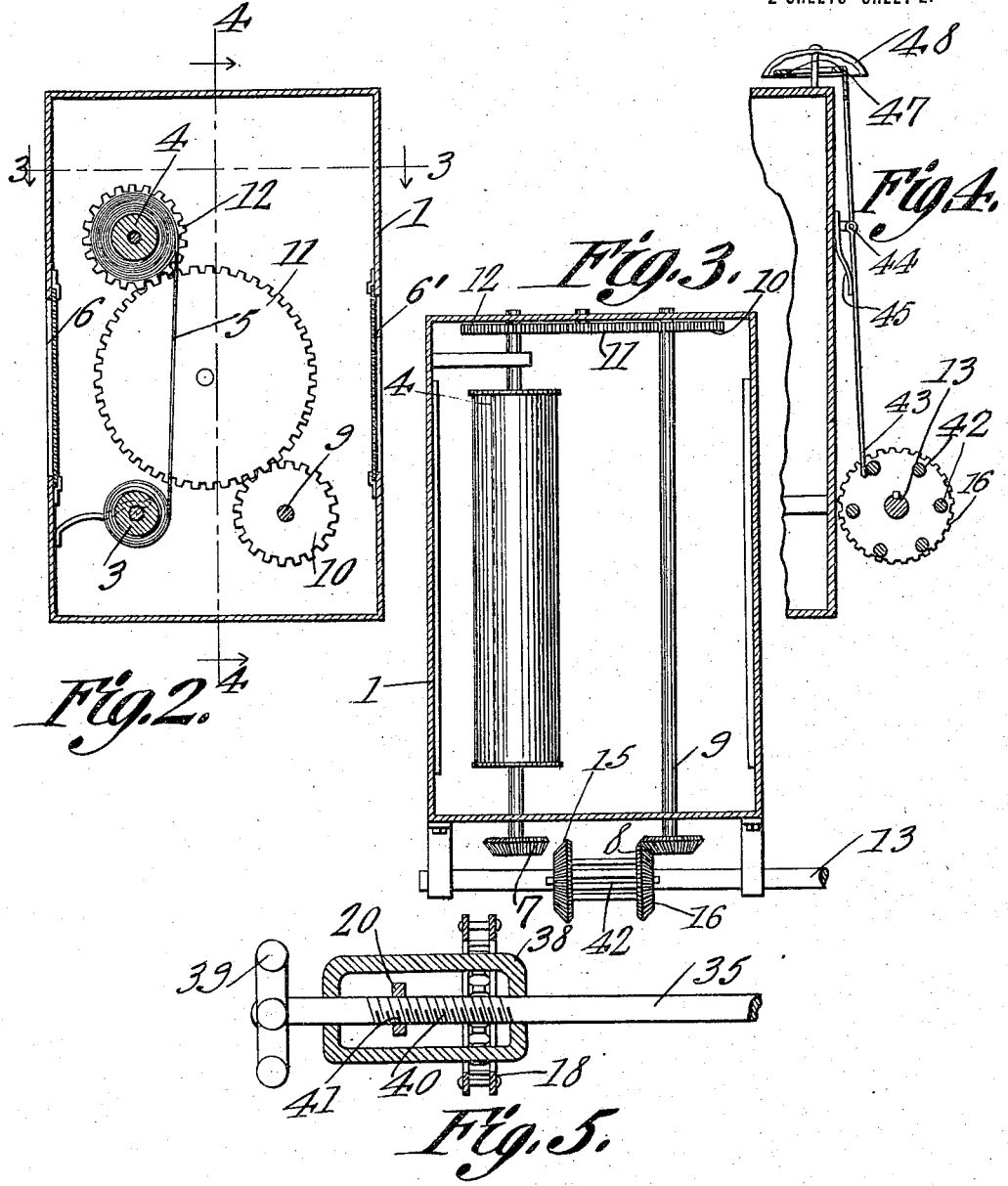

UNITED STATES PATENT OFFICE.

EDWARD D. DENNIS, OF PLYMOUTH, WISCONSIN.

INDICATING MECHANISM.

1,187,273.  Specification of Letters Patent.  Patented June 13, 1916.

Application filed April 14, 1915. Serial No. 21,396.

*To all whom it may concern:*

Be it known that I, EDWARD D. DENNIS, a citizen of the United States, residing at Plymouth, in the county of Sheboygan and State of Wisconsin, have invented a new and useful Indicating Mechanism, of which the following is a specification.

The present invention relates to improvements in indicating mechanisms, one object of the invention being the provision of a tally indicator and a main indicator, both of which are operably connected together so that the operator can keep tabs upon the operation of the main indicator and operate such main indicator simultaneously with the operation of the tally indicator.

A still further object of the invention, is the provision of means disposed adjacent to the tally indicator to indicate the movements of the actuating mechanism and to compensate for the varying sizes of the tape rolls, due to the increased or decreased size as the tape is wound upon and wound off them.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in plan showing the main and the tally indicators operably connected together, the supports for the same merely being shown in diagram. Fig. 2 is an enlarged cross section through the main indicator. Fig. 3 is a section taken on line 3—3 through the main indicator of Fig. 2. Fig. 4 is a section taken on line 4—4 of Fig. 2 showing only the rear wall of such indicator, to clearly indicate the audible alarm mechanism. Fig. 5 is an enlarged detail view of the means for shifting the operating mechanisms of the main and tally indicators. Fig. 6 is an enlarged view in side elevation of the manual control for operating the indicators. Fig. 7 is an enlarged detail view of the mechanism for operating the compensating cam. Fig. 8 is a view similar to Fig. 6 of a modified form of actuating mechanism.

In describing the main and tally indicators, the primed characters shown upon the tally indicator correspond to similar characters of the main indicator, as the mechanisms of both are identical.

Referring to the drawings, the numeral 1 designates the casing of the main indicator, and 2 the casing of the tally indicator.

The lower tape carrying roll 3 is journaled in the respective casings and is vertically below the upper tape carrying roller 4, so that the indicator carrying tape 5 will be moved and held in a vertical plane during exhibition, the main indicator casing, as shown in Fig. 2, being provided with the oppositely disposed sight apertures 6—6', so that the sign upon the indicator tape 5 may be visible from two sides of the casing. In the casing 2 only one sight aperture is necessary as it is merely visible to the operator at the operating side thereof.

Fixed upon the lower roller 3 is a bevel pinion 7, while a bevel pinion 8 which is fixed upon the shaft 9 is journaled parallel to and at the rear of the roller 3. This shaft is provided with a gear 10 which operates the intermediate gear 11 and through the gear 11 transmits motion to the gear 12 fixed upon the upper roller 4. By means of the two bevel gears 3 and 8, a downward and upward movement respectively, is imparted to the tape 5, thus permitting the movement in one direction as the car upon which the indicator is installed is moving, and also permitting the reversing of such route by moving the tape in the opposite direction.

A shaft 13 is so mounted as to be permitted a longitudinal sliding movement, the same having fixed thereupon the two bevel pinions 15 and 16 which are adapted to engage one at a time the bevel pinions 7 and 8 so that as the shaft 13 is revolved, either one of the gears 7 or 8 is revolved, and consequently the tape 5 is moved up or down as elected.

In order to provide a means for operating in synchronism, the two shafts 13 and 13', a sprocket 17 is fixed upon the shaft 13' and has led thereover the sprocket chain 18, which engages the sprocket 19 carried upon the shaft 13. As before stated, both shafts 13 and 13' are capable of longitudinal sliding movement, and therefore in order to impart such movement simultaneously to both shafts, so as to select which of the bevel pinions 7—7' or 8—8' are to be actuated, a rod 20 connected at 21 to the shaft 13 and provided with the open frame 22 where it is connected to the shaft 13', is provided.

In order to slide the rod 20 and consequently the two shafts in synchronism, the rod 35 which is provided with a head 36 fitted within the socket 37 and supported in any convenient manner, is disposed through the yoke 38 between which fits the rod 20, the same, as clearly illustrated in Fig. 5, being threaded as at 41 for the reception of the threads 40 of the rod 35. The rod 35 is provided with the handle or hand member 39 by means of which the same may be rotated. By this means, the rotation of the rod 35 imparts through the threaded connection, a sliding movement to the rod 20 and consequently slides both shafts 13 and 13' and shifts the respective gears 7—7' and 8—8'.

In order to provide a means for rotating both of the shafts 13 and 13' in synchronism and at the same time operating them so that the respective tapes 5 and 5' will be operated at a proper distance, and also to regulate such distance by compensating for the difference in sizes of the respective rolls 3—3' and 4—4', a ratchet wheel 23 is fixed upon the shaft 13', while mounted for oscillation upon such shaft is the lever 24 provided with a spring actuated pawl 25, the stops 26 and 26' as illustrated in Fig. 6 being provided to limit the lever's swing. Ordinarily, the lever 24 would have the same latitude of movement, and therefore all of the respective rollers actuated thereby would be rotated the same distance, in order to therefore compensate for the varying sizes of the tape rollers, a cam 30 is journaled upon the shaft 27 supported by the arm 29 to form a limiting means for the lever 24 in its manual movement when the same is operated toward the lug 26'. In order to present the cam 30 in the proper position to the lever 24, a bevel gear 31 is fixed upon the shaft 13' within the open frame 22 and meshes at all times with the gear 32 fixed upon the shaft 33. A worm gear 34 is carried by the shaft 33 and meshes with the coöperating worm gear 35' fixed upon the sleeve 35'' which also is attached to the cam 30, so that the sleeve 35'' and cam 30 are rotated synchronously with the shaft 13' and consequently the cam 30 is positioned to form a variable limiting means for the lever 24, so that the varying sizes of the respective tape rollers will be compensated for and the proper presentation space of the tapes 5 and 5' will be alined at all times. The gear 35' is sufficiently long to receive the gear 34 at both extreme positions of the shaft 13'.

In order to provide an audible alarm to call attention to the operation of the main indicator, the rods 42 form a spool with the gears 15 and 16 upon the shaft 13 adjacent the casing 1, to actuate a trip member 43, which is pivoted at 44 to the casing 1. As the shaft 13 is revolved, the rods 42 intermittently operate the member 43 against the spring 45, causing the clapper 47 to strike and ring the bell 48.

From the foregoing description, it will be seen that with the present mechanism, in which a main indicator and a tally indicator are used, that the operator can at a glance ascertain whether or not the proper indicating mark is visible at the main indicator without looking at the main indicator, and that by means of the shifting mechanism the tapes of both indicators are assured of operation synchronously.

By employing the compensating device in combination with the manually controlled lever, thus limiting the throw thereof, the proper presentation of the indicator tape is assured at all times, regardless of the increasing or decreasing size of the roll of tape on the respective feed-on or feed-off rollers.

As shown in Fig. 8, the lever 24' is connected by a link 49 to the driving member 49', which is operated by a sprocket chain 50, from a distant point to thus actuate the ratchet wheel 23.

What is claimed is:

1. An indicating mechanism, including a main indicator; a tally indicator, both indicators having an indicator tape, forward and reverse transmission mechanisms for the tapes, a longitudinally slidable shaft, and means carried by said shaft for selectively engaging the forward or reverse mechanism one at a time; means for connecting both of the shafts for sliding movement in synchronism; means operably connecting both shafts for rotation in synchronism; and manually operated means for rotating the slidable shaft of the tally indicator and through the operating mechanism rotating the sliding shaft of the main indicator.

2. An indicating mechanism, including a main indicator; a tally indicator; both indicators having an indicator tape, forward and reverse transmission mechanisms for the tapes, a longitudinally slidable shaft, and means carried by said shaft for selectively engaging the forward or reverse mechanism one at a time; means for connecting both of the shafts for sliding movement in synchronism; means operably connecting both shafts for rotation in synchronism; manually operated means for rotating the slidable shaft of the tally indicator and through the operating mechanism for rotating the sliding shaft of the main indicator; and means for regulating the distance of actuation of the last means in ratio to the gradually increasing or decreasing size of the tape carrying rollers.

3. An indicating mechanism, including two parallel longitudinally slidable shafts mounted for rotation, means connecting said shafts whereby both are slid in synchronism; means for operably connecting said shafts for rotation in synchronism; a main indicator mechanism having a tape, and two rolls connected to the tape, means operably connected to the roll for imparting a forward and reverse movement to the tape, means carried by one of the sliding shafts for selectively engaging one of said means to impart the selected movement to the tape, a tally indicator having a tape, two rollers connected to the tape, forward and reverse movement imparting mechanism operably connected to said rollers, means carried by the remaining sliding shaft for selectively engaging one or the other of the latter means, and manually controlled means for operating both shafts, said latter means being adjacent the tally indicator.

4. An indicating mechanism, including two parallel longitudinally slidable shafts mounted for rotation, means connecting said shafts whereby both are slid in synchronism; means for operably connecting said shafts for rotation in synchronism; a main indicator mechanism having a tape, and two rollers connected to the tape, means operably connected to the rollers for imparting a forward and reverse movement to the tape, means carried by one of the sliding shafts for selectively engaging one of said means to impart the selected movement to the tape, a tally indicator having a tape, two rollers connected to the tape, forward and reverse movement imparting mechanism operably connected to said rollers, means carried by the remaining sliding shaft for selectively engaging one or the other of the latter means, manually controlled means for operating both shafts, said latter means being adjacent the tally indicator, and means operably connected to the sliding shaft of the tally indicator for regulating the actuation of the manually controlled means to compensate for the increased or decreasing size of the rollers due to the winding and unwinding of the tape thereupon.

5. An indicating mechanism including a main indicator, a tally indicator, forward and reverse transmission mechanisms for each indicator, separate slidable selective means for engaging the forward or reverse mechanism one at a time of the respective indicators, said selective means being movable synchronously, and means for simultaneously actuating the two indicators.

In testimony that I claim the foregoing as my own, I have hereto affixed my signature in the presence of two witnesses.

EDWARD D. DENNIS.

Witnesses:
 H. F. DEICHER,
 H. J. ROONEY.

Copies of this patent may be obtained for five cents each, by addressing the "Commissioner of Patents, Washington, D. C."